United States Patent
Polit et al.

(10) Patent No.: US 7,280,528 B1
(45) Date of Patent: Oct. 9, 2007

(54) CALL SETUP FOR IP/INTERNET TELEPHONY

(75) Inventors: Peter Paul Polit, Indianapolis, IN (US); Wenhua Li, Brownsburg, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/582,402

(22) PCT Filed: Jan. 27, 1999

(86) PCT No.: PCT/US99/01600

§ 371 (c)(1),
(2), (4) Date: Jun. 23, 2000

(87) PCT Pub. No.: WO99/38310

PCT Pub. Date: Jul. 29, 1999

(51) Int. Cl.
*H04L 12/66* (2006.01)
(52) U.S. Cl. ..................................... 370/352
(58) Field of Classification Search ................ 370/352, 370/353, 351, 356, 492, 293; 379/201.04, 379/201.07, 201.08, 207.02, 207.16
See application file for complete search history.

(56) References Cited

U.S. PATENT DOCUMENTS

| | | | |
|---|---|---|---|
| 5,142,569 A * | 8/1992 | Peters et al. ........... | 379/207.16 |
| 6,108,329 A * | 8/2000 | Oyama et al. ............... | 370/352 |
| 6,304,649 B1 * | 10/2001 | Lauzon et al. ......... | 379/211.01 |
| 6,345,047 B1 * | 2/2002 | Regnier ....................... | 370/352 |
| 6,404,764 B1 * | 6/2002 | Jones et al. .................. | 370/352 |
| 6,636,506 B1 * | 10/2003 | Fan ........................... | 370/356 |
| 6,763,020 B1 * | 7/2004 | Hon ........................... | 370/356 |

FOREIGN PATENT DOCUMENTS

| | | |
|---|---|---|
| EP | 758175 | 2/1997 |
| EP | 781016 | 6/1997 |
| WO | 97/29581 | 8/1997 |
| WO | 98/11704 | 3/1998 |
| WO | 99/00954 | 1/1999 |

* cited by examiner

*Primary Examiner*—Chi Pham
*Assistant Examiner*—Anh-Vu Ly
(74) *Attorney, Agent, or Firm*—Joseph J. Laks; Ronald H. Kurdyla; Joel M. Fogelson

(57) ABSTRACT

A method for setting up a voice call over an IP network is described. The method first initiates an IP voice call to a called device connected to a telephone line. The method then determines whether the called device is already connected to the IP network. If the called device is not already connected to the IP network based on the determining step, the method will initiate a telephone call with an associated telephone signal through the telephone line to the called device, to alert the called device that an IP voice call is pending.

18 Claims, 2 Drawing Sheets

CALL SETUP FOR IP/INTERNET TELEPHONY

FIELD OF THE INVENTION

The present invention generally relates to a method for providing a voice connection over an IP (Internet Protocol) network such as the Internet. In particular, the present invention relates to a method of automatic call setup and call alerting by utilizing distinctive ring patterns or caller ID information.

BACKGROUND OF THE INVENTION

One of the primary reasons for interest in offering IP/internet telephony services is the pricing structures currently in place for the data services, and voice services offered by telephone operators. Long distance voice service can be thought of as "demand data" service, where the user pays a premium for the instantaneous access to a 64 Kbps channel (voice grade channel in the U.S.). Widely publicized, promotional type pricing for this service Is on the order of $0.10 a minute. By contrast, data service offered by telephone operators, such as that offered for a T-1 connection (24 voice quality data lines, for a 1.544 Mbps connection) is priced at approximately $1000/month, which works out to $0.001 a minute per voice line. In the very near future, cable operators will place extreme pressure on even the data service rates for telephone operators, as cable modems will allow cable operators to offer hundreds of Kbps effective throughput for approximately $50/month.

IP telephony is also one of the first and most visible steps toward an Integrated Services Internet, which carries real time data, voice and video.

The basic Idea of IP/internet voice telephony is to digitize your voice as you talk on the phone and send the digitized data as IP packets to the Internet. An IP voice device can be embedded within an Internet connection device such as a modem, a set-top-box, or a computer. It can be also built as a stand alone product. The stand alone IP voice device, for example, may provide an Ethernet jack which can be connected with an Internet connection device and other LAN devices. The IP voice device may also include interfaces to connect regular phone handsets. The quality of speech heard through a normal telephone line requires 64 kbits/s bandwidth. However, most current internet connections have less bandwidth, such as 28.8 kBPS, or 56 kBPS modem. Furthermore, even if a fast connection device is used, such as an ISDN, or Cable Modem, the Internet network itself is a shared medium and has limited bandwidth. Therefore, audio codecs are usually embedded to compress the voice data.

To guarantee the interoperability between IP voice devices from different vendors, International Telecommunications Union (ITU) developed H.323 as the standard for telephony over IP network. H.323 defines common procedures for call setup, data compression, and data transport.

H.323 is an umbrella standard which references many other ITU recommendations. It provides various levels of multimedia communications. These levels include voice only, voice and video, voice and data, or voice, video, and data communications over a local area network. The voice only H.323 protocol stack includes RTP/RTCP, RAS/Q.931 (H.225,0), and H.245. RTP/RTCP is used for packetization and synchronization of voice data. RAS/Q.931 describes the call registration, admission, and status as well as call signaling. H.245 defines the control messages and procedures.

In a general sense, IP telephony can be thought of has providing a "virtual" point to point connection for voice services over Internet. Various IP telephony devices currently exist in the marketplace. Some examples include VocalTec® Internet Phone® Lite which is a software product to be used in a multimedia PC, made by Vocaltech Corporation of Northvale, N.J. Other examples of product include CoolTalk of Netscape or NetMeeting of Microsoft. Most of these software based products reside in a client server such as a PC or a network computer (NC) that require a microphone, speaker and a sound card. Other products come in the form of a handset, which basically incorporates the function of the microphone and speaker in the software-based product.

As an example of how to place a call, suppose a user in Indianapolis wants to call his friend in Paris. He would pick up his IP voice device handset (or a virtual handset on the computer screen) and hear a dial-tone like a regular telephone dial-tone. Then, he dials his friend's Paris phone number. The call travels over the Internet to a server provided by the IP telephony service provider. The server connects the call to his friend's IP voice device and initiates the call. If his friend has only a regular telephone, the server will connect the call to a gateway in Paris. The gateway in Paris then initiates a call over the public switched telephone network (PSTN) to the local Paris number.

Depending on the Internet connections, there are basically two methods for making calls using an IP voice device: dial-up connections, and direct connections.

With a dial-up connection, a user first calls an ISP (Internet service provider) over a regular dial-up line to set up an Internet connection. Then, he will use the IP voice device handset to dial the phone number of the person he is calling. With a direct or permanent connection, a user places a call using the IP voice device just as he does with the regular telephone. The direct connection indicates a permanent open channel to the Internet such as ISDN, or a cable access device. For dial-up connection call, a phone that has been called won't ring unless the Internet connection is already established for this phone. For direct connection call, a phone would ring like a normal telephone.

European Patent Application, EP-A-0781016, discloses a known Internet telephone system. The system disclosed allows a server connected to a called device to use the telephone number of the telephone line connected to the called device, in order to set up the internet telephone call. However, there still needs to be an efficient and easily implementable way to further distinguish whether a call to the called device is an internet call or a regular telephone call, so that the call may be handled correctly and automatically.

SUMMARY OF THE INVENTION

The present applicants recognize that one problem of using dial-up connections for providing IP telephony is that the recipient or the callee of an internet call must be on-line waiting for the IP call. So, the sender (or the caller) will have to first call the recipient using a regular PSTN phone to make the appointment in advance so that the callee is already connected to the internet when the Internet call arrives. This defeats the purpose of eliminating the regular telephone call to save money and resources.

Therefore a need has been recognized to provide a method which automatically sets up the Internet connection for the receiving IP voice device if it is off line. Accordingly, a method for setting up a voice call 30 over an IP network is described, comprising the steps of:

initiating an IP voice call to a called device connected to a telephone line; determining whether the called device is connected to the IP network; and initiating a telephone call with an associated telephone signal through the telephone line to the called device, in response to the called device being not connected to the IP network as determined the determining step.

DETAILED DESCRIPTION OF THE INVENTION

Figure 1:
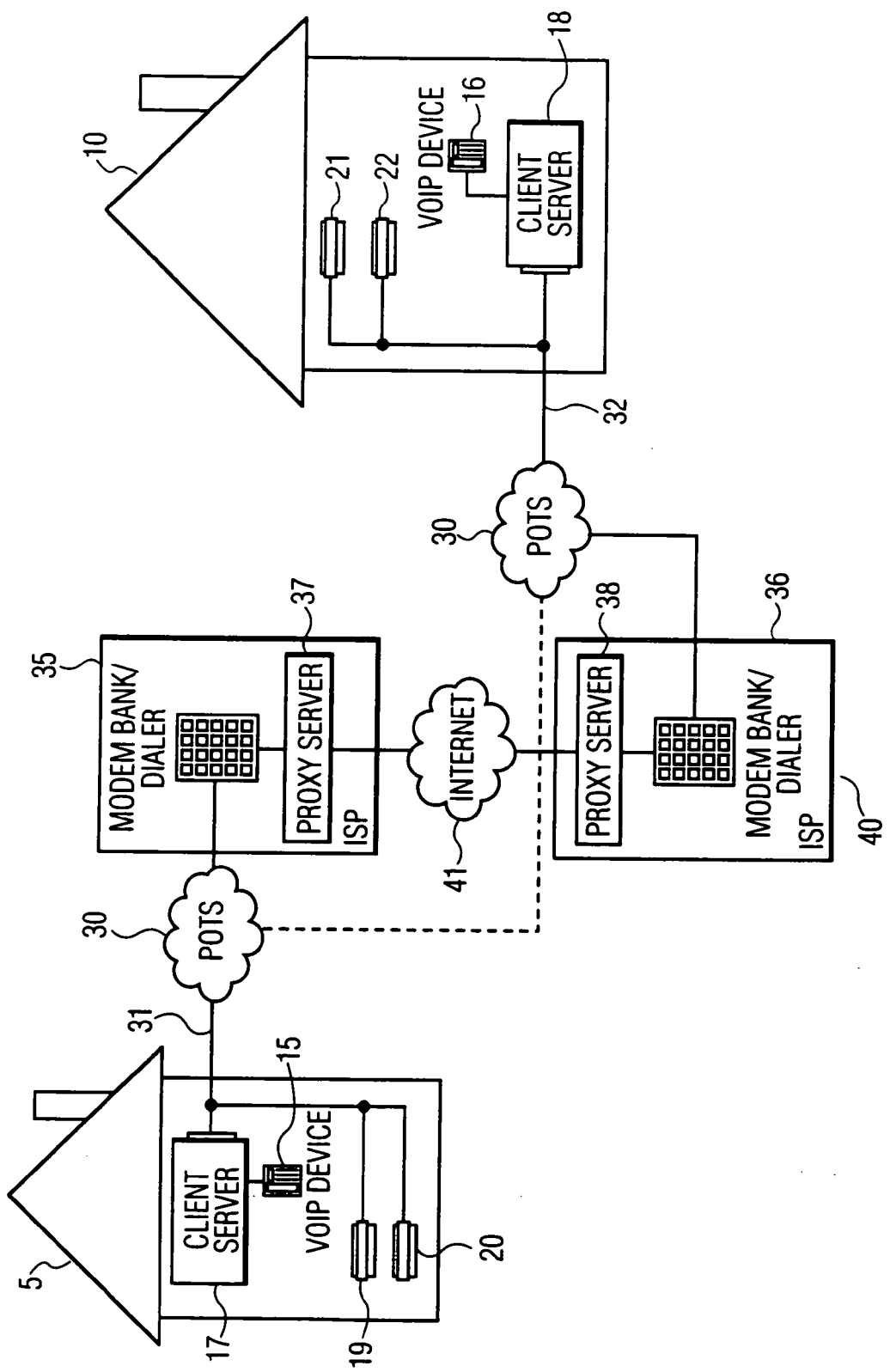
FIG. 1 is a block diagram of an exemplary system incorporating principles of the present invention.

In FIG. 1, there are two households 5 and 10 each with a respective Voice Over IP (VOIP) device 15 and 16. As discussed above, this device may be one of the many devices available on the market today. The VOIP devices 15 and 16 are each connected to a client server 17 or 18 respectively which, for example, may be a PC or a network computer, serving as a client host for connection to the internet. As discussed above and readily recognized by one skilled in the art, the combination of VOIP device 15 or 16 and a client server 17 or 18 may be replaced by a multi-media PC with a microphone, speaker, a sound card and an appropriate VOIP software.

The client server 17 or 18 is each connected to the POTS (Plain Old Telephone Service) network or PSTN (Public Services Telephone Network) 30 through dial-up telephone lines as discussed previously.

Figure 2:
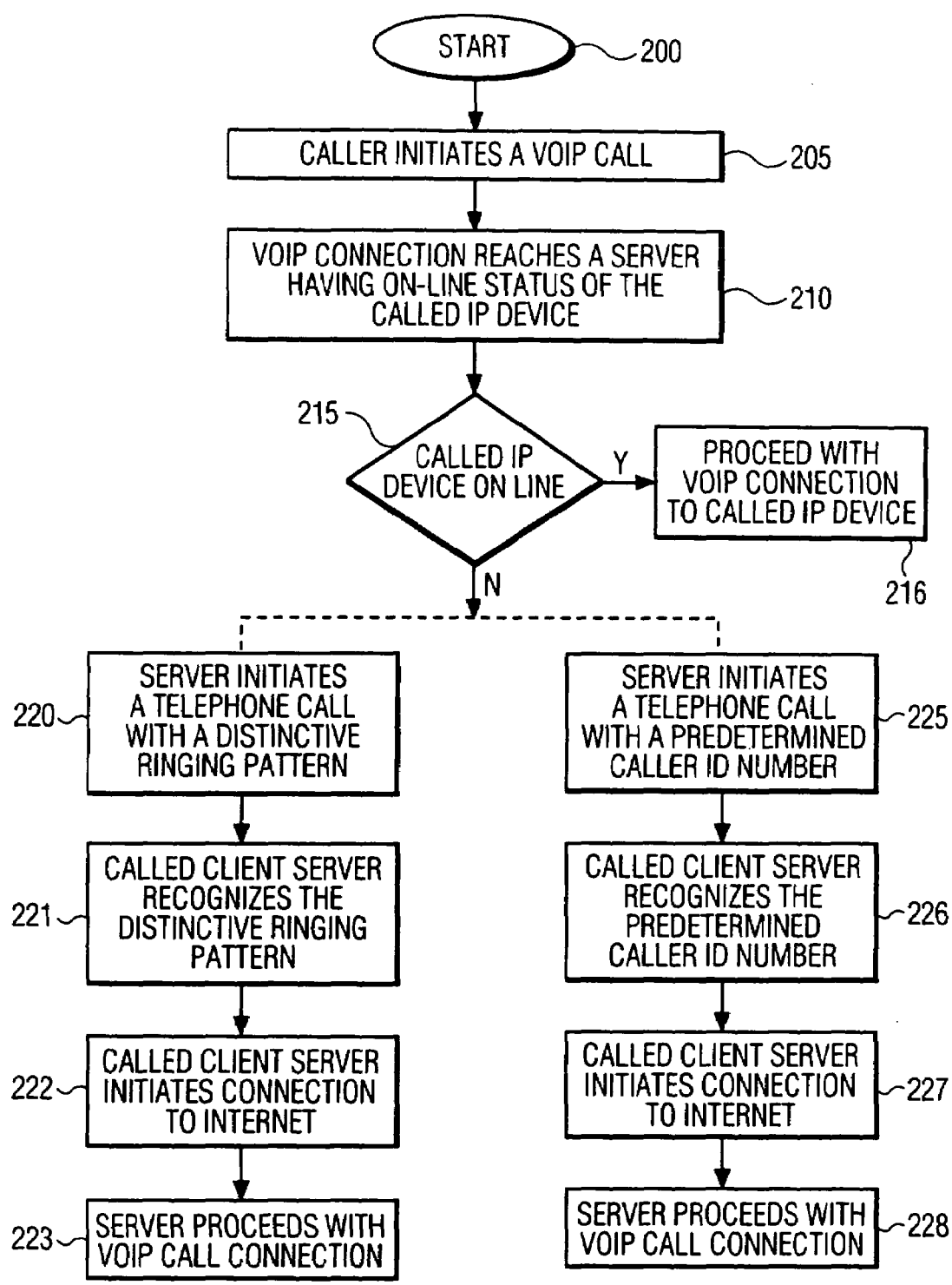
FIG. 2 is a flowchart illustrating a method of operation of the system shown in FIG. 1.

An exemplary process of automatically setting up an internet call is shown in FIG. 2. As shown in Step 205 of FIG. 2, a caller in household 5 first initiates a Voice over IP call to a callee in household 10. In the dial up configuration of FIG. 1, the client server 17 will have to first be connected to the internet 40. One exemplary way the client server 17 can be connected to the internet 40 is by the caller manually calling his or her ISP provider 35 using a modem (not shown) in the client server 17. This process of connecting to the ISP provider may also be automated by the client server software in response to the calling VOIP device 15 initiating an internet call.

Once the caller is on the Internet through the ISP provider, he can then request a Voice over IP connection to a particular device on the internet. The caller can do that by providing an IP address of the callee he or she wishes to make an internet telephone connection to. This callee's IP address is first transmitted to the proxy server 37 of the ISP 35. The proxy server 37 will then attempt to make an IP connection to the callee's VOIP device, for example, 16 in household 10. The proxy server 37 will attempt to make this connect by first making a connection to the far end proxy server, for example, proxy server 38, serving the callee's VOIP device 16 and the associated client server 18 in household 10.

As shown in Step 210, when the VOIP call reaches the proxy server 38 serving the called IP device 18, the proxy server 38 is able to determine the on-line status of the destination client server 18, since the proxy server 38 is aware of the on-line status of all units it is serving. At Steps 215 and 216, if the called client device 18 is already on-line, the proxy server 18 will proceed with the VOIP call connection between the source and destination client servers 17 and 18. The destination client server 18 will then generate a special IP ring or signal to alert the callee that an IP phone call is coming.

If the client server 18 is off-line as determined by Step 215, the proxy server 38 will send a message back to the caller indicating the lack of immediate availability of the client server 18 and optionally may prompt the caller for an estimated waiting time for establishing the connection, as shown in Step 220. Next, the server initiates a call to the callee over PSTN 30. This will generate a special signal as to be described below in detail to the receiving client server device 18 and the recipient regular telephones. This signal will be recognized as an Internet call setup signal instead of a regular telephone ring signal. After the client server device 18 recognizes this call setup signal, it will dial up ISP 40 to set up the Internet connection. When the Internet connection is successfully set up, the receiving client server device 18 will send an acknowledge message to the proxy server 37 and a communication channel will be set up between the caller and callee. If after some specified time, the calling client 17 server has not received an acknowledgement indicating that the called device 16 or 18 is available, the calling client server 17 will advise the caller to use a normal telephone call.

There are at least two approaches for a client server device to recognize an Internet phone call from the proxy server 38 as discussed above.

One exemplary method utilizes the distinct telephone ring patterns for a secondary line such as "teen line", as shown in Step 220. A secondary line such as "teen line" has a unique phone number but shares the same physical line with the main phone number. The ring patterns for the secondary line and primary line are different. The different ring patterns are usually used to distinguish between incoming calls intended for different recipients at one location, e.g., between a call intended for a parent and a call intended for a child. In this method, the proxy server 38 dials the destination device 18 using a "teen line" number. The client server device 18 then recognizes the regular telephone call from the proxy server through the PSTN by detecting the special "teen line" ring pattern, as in Step 221. If the ring signal is a "teen line" ring, the client server device 18 will discontinue the call and dial up the ISP 38 to set up the internet connection in Step 222. The IP phone call can then be started, as in Step 223.

If, on the other hand, the ring signal is a regular ring, the client server 18 will ignore it and it will keep ringing the regular telephone. It should be understood that the user should not pick up a phone when the ring is a "teen line" ring as doing so may interfere with completion of the IP phone call.

Another exemplary method of a client server recognizing an internet phone call utilizes Caller ID information, such as type 1 Caller ID information. Type 1 caller ID Information is transmitted during the ringing, off-hook stage of a regular telephone call.

According to this exemplary method, a special phone number is assigned to proxy server, 38. As shown in step 225, when the proxy server 38 dials the destination device 18 to alert the callee of an incoming VOIP call, the specially assigned phone number is sent as type 1 Caller ID information. By decoding the Caller ID information at step 226, the destination client server 18 can recognize the incoming call from the proxy server 38. The operations after the call recognition are shown in FIG. 2 as steps 227 and 228 and are the same as described for the first exemplary method described above. It should be understood that the user should not pick up a phone when it rings the first time, as doing so may interfere with reception and recognition of the caller ID Information. This limitation is a normal requirement for use of type 1 Caller ID information.

It is to be understood that the embodiments and variations shown and described herein are illustrations only and that various modifications may be implemented by those skilled in the art without departing from the scope and spirit of the invention.

The invention claimed is:

1. A method for setting up a voice call over Internet, comprising the steps of:
    initiating an Internet voice call to a called device;
    determining whether the called device is already connected to the Internet;
    initiating a first connection by placing a PSTN telephone call with associated caller ID information to the called device, if the called device is not already connected to the Internet; and
    establishing said Internet voice call with the called device wherein said called device in response to the associated caller ID information connects to the Internet by initiating a second connection through a data network.

2. The method of claim 1 wherein the associated caller ID information is a predetermined caller ID number.

3. The method of claim 1, wherein said caller ID information is associated with a device initiating said method.

4. The method of claim 3, wherein said device initiating said method is a server that operates between a caller device and said called device.

5. The method of claim 1, wherein said caller ID information is type I caller ID information.

6. The method of claim 1, wherein a distinctive ringing pattern is used with said caller ID information for establishing an Internet voice call to said called device.

7. The method of claim 1, wherein said second connection is a different and therefore separate connection from the first connection made through the PSTN.

8. The method of claim 7, wherein said second connection is made after said first connection made through the PSTN is terminated.

9. A method for setting up an IP voice call through an IP network, comprising the steps of:
    initiating an IP voice call to a called device;
    determining whether the called device is connected to the IP network;
    initiating a first connection by placing a PSTN telephone call with a distinctive ringing pattern to the called device, if the called device is not already connected to the IP network; and
    establishing said IP voice call with said called device, wherein said called device in response to said distinctive ringing patterns connects to the IP network by initiating a second connection via said IP network.

10. The method of claim 9, wherein the distinctive ringing pattern is different from the ringing pattern of a regular PSTN telephone call.

11. The method of claim 9, wherein called ID information is used with said distinctive ringing pattern for establishing an Internet voice call to a called device.

12. The method of claim 9, wherein said IP network connection is a separate connection from the first connection made through the PSTN network and is made after said first connection is terminated.

13. A method for receiving an IP voice call for a receiving device, comprising the steps of:
    receiving an IP voice call through an IP network, if the receiving device is connected to the IP network;
    connecting the device to the IP network in response to:
        a. receiving a PSTN telephone call comprising at least one of: a distinctive ringing pattern, and a caller ID information through a PSTN line, said received PSTN telephone call being a first data connection which is terminated after receiving at least one of said distinctive ringing pattern and the caller ID information;
        b. comparing the received caller ID information with a predetermined caller ID information, when caller ID information is received;
        c. initiating a second data connection by connecting to the IP network as to establish the IP voice call in response to at least one of: the distinctive ringing pattern, and if the received caller ID information matches the predetermined caller ID information.

14. The method of claim 13, wherein said caller ID information is associated with a device initiating said method.

15. The method of claim 14, wherein said device initiating said method is a server that operates between a caller device and said receiving device.

16. The method of claim 13, wherein said caller ID information is type I caller ID information.

17. The method of claim 13, wherein said second connection is a different and therefore separate connection from the first connection made through the PSTN telephone line.

18. The method of claim 17, wherein said second connection is made after said first connection through the PSTN telephone line is terminated.

* * * * *